US010834197B2

(12) United States Patent
Estes et al.

(10) Patent No.: US 10,834,197 B2
(45) Date of Patent: Nov. 10, 2020

(54) APPLICATION MANAGEMENT SERVICE

(71) Applicant: Itron, Inc., Liberty Lake, WA (US)

(72) Inventors: Jason Estes, Spokane, WA (US); Andrew Keats, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 33 days.

(21) Appl. No.: 16/237,169

(22) Filed: Dec. 31, 2018

(65) Prior Publication Data

US 2020/0213395 A1 Jul. 2, 2020

(51) Int. Cl.
*H04L 29/08* (2006.01)
*G06F 8/61* (2018.01)

(52) U.S. Cl.
CPC ............... *H04L 67/12* (2013.01); *G06F 8/61* (2013.01); *H04L 67/10* (2013.01)

(58) Field of Classification Search
CPC . H04L 67/12; H04L 67/10; G06F 8/61; G06F 21/57; G06F 21/629; G06F 21/121; G06F 21/105; H04W 4/38; H04W 4/50; H04W 4/70
See application file for complete search history.

(56) References Cited

U.S. PATENT DOCUMENTS

| | | |
|---|---|---|
| 2013/0054682 A1 | 2/2013 | Malik et al. |
| 2014/0359595 A1* | 12/2014 | Sehgal ...................... G06F 8/61 717/171 |
| 2015/0355899 A1* | 12/2015 | Agarwal ................. G06F 8/658 717/170 |
| 2017/0083923 A1* | 3/2017 | Dubey ..................... H04L 67/10 |
| 2017/0099176 A1* | 4/2017 | Jain ......................... H04L 67/12 |
| 2017/0187831 A1* | 6/2017 | Otting .................. H04W 12/009 |
| 2017/0357492 A1* | 12/2017 | Adler ....................... H04L 67/34 |
| 2018/0314808 A1 | 11/2018 | Casey et al. |
| 2019/0147349 A1* | 5/2019 | Ng .......................... G06N 20/00 706/12 |
| 2019/0190771 A1* | 6/2019 | Fang .................... H04L 41/5048 |
| 2019/0288985 A1* | 9/2019 | Chambers ........... H04L 63/0236 |
| 2019/0327505 A1* | 10/2019 | Schwimmer ............ H04L 65/80 |

FOREIGN PATENT DOCUMENTS

EP 2523142 11/2012

OTHER PUBLICATIONS

The PCT Search Report and Written Opinion dated Apr. 2, 2020 for PCT Application No. PCT/US2019/069133, 11 pages.

* cited by examiner

*Primary Examiner* — Arvin Eskandarnia
*Assistant Examiner* — Chhian (Amy) Ling
(74) *Attorney, Agent, or Firm* — Lee & Hayes, P.C.

(57) ABSTRACT

An application management service may be used to determine which agents of an application need to be installed and/or licensed on one or more smart sensors. The application management service may determine which agents are associated with a given application and may determine which agents are currently installed and/or licensed on the one or more smart sensors. The application management service may determine which agents are not currently installed or licensed on the one or more smart sensors and that are associated with the application and may cause those agents to be installed or licensed on the one or more smart sensors.

20 Claims, 8 Drawing Sheets

APPLICATION MANAGEMENT SERVICE

BACKGROUND

Utility meters such as electric, water, and natural gas meters have evolved from isolated devices that simply measure utility consumption and display a consumption reading to so called "smart meters" that are connected devices capable of reporting resource consumption readings automatically over a utility communication network. Such meters utilize increasingly complex and specialized software to perform required functions. Unfortunately, existing management solutions have not enabled efficient management of these meters and the software that runs on them.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Overview of System Architecture

Figure 1:
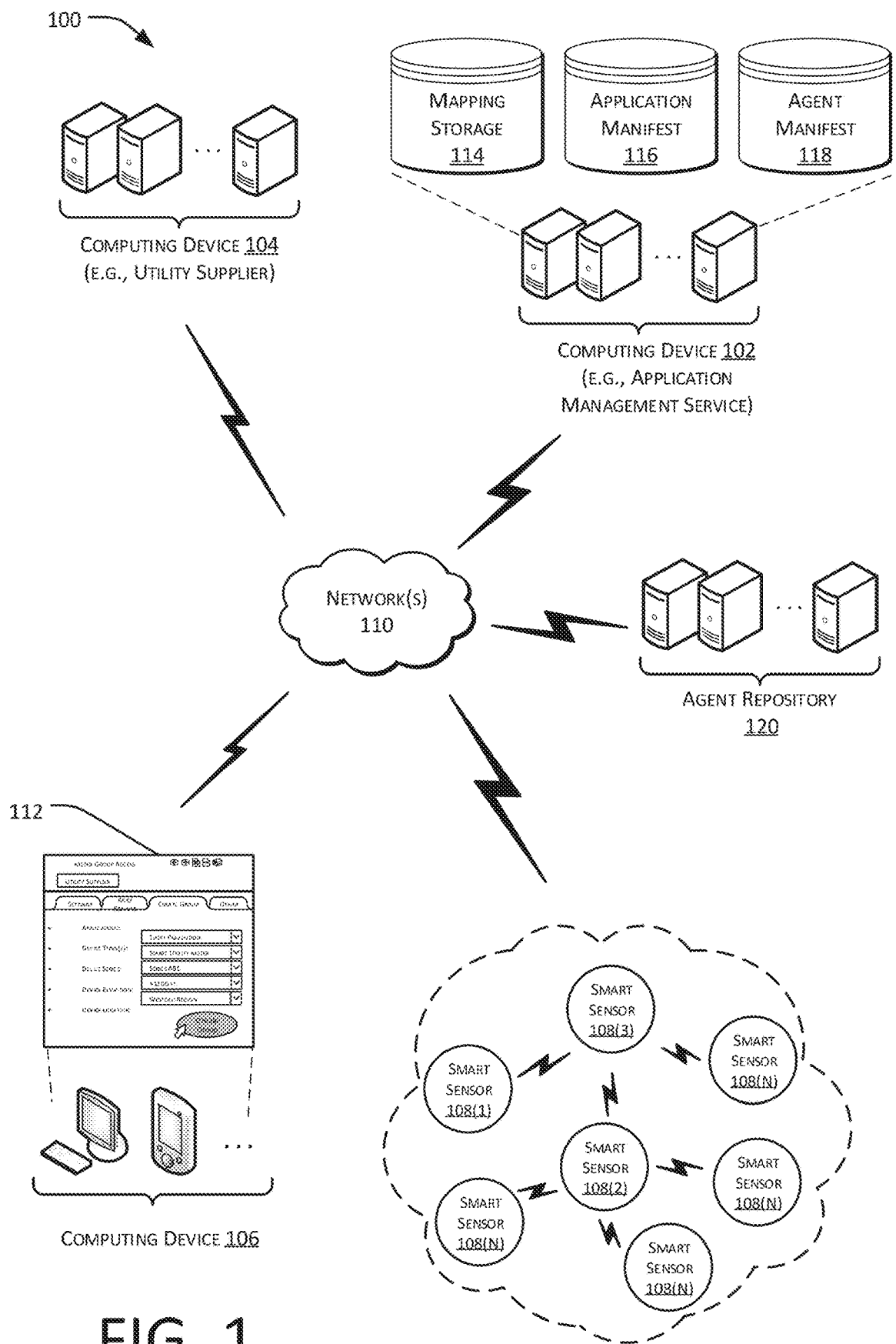
FIG. 1 is a schematic diagram of an example architecture usable to facilitate management of applications associated with one or more smart utility meters or other smart sensors.

Existing systems make it difficult to manage the software that runs on utility meters or other smart sensors. For example, a smart sensor may be configured to store one or more agents (e.g., software programs or daemons) that report data related to the smart sensor to an application running on one or more remote computing devices (e.g., utility company computing devices, cloud computing resources, or the like). An agent may include multiple features that perform operations and/or collect data. Multiple applications may be associated with the same agent, and therefore, the same features. In some cases, when an entity wishes to associate the smart sensor with a new application, the smart sensor may already store agents and/or features that the new application is associated with because a previous application that the smart sensor is associated with is already associated with said agents and/or features. Transmitting repetitive and redundant instructions to install software on multiple smart sensors (in some cases millions of smart sensors) places unnecessary strain and traffic on a network. This disclosure describes an application management service that can, in some instances avoid such unnecessary load and traffic, by storing one or more maps or manifests of which smart sensors are associated with which applications, which applications are associated with which agents, and/or which agents are associated with which features.

In some examples, this disclosure describes techniques for enabling efficient installation of agents onto one or more smart sensors. An agent running on a smart sensor may report data to an application, via a communication network, that is associated with the one or more smart sensors. The agent may include one or more features that perform various operations and/or collect data. The features may, among other things, collect data that pertains to the smart sensor (e.g., metrology data, consumption data, etc.) and/or the environment in which the smart sensor is located. As used herein, the term "smart sensor" means a measuring and/or sensing device which measures or senses physical parameters (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device.

In some examples, a computing device associated with an application management service may include a mapping storage which may store a list of one or more smart sensors and each agent and/or feature that is associated with each of the one or more smart sensors. In some cases, the agents and/or features (e.g., software running on the meters) may provide the application that each is associated with data related to the smart sensor. In some cases, the application management service may store an application manifest which lists one or more applications and one or more agents associated with each of the one or more applications. In some cases, the application management service may store an agent manifest, which lists one or more agents and one or more features associated with each of the one or more agents. Sending repetitive instructions to a smart sensor or a group of smart sensors to install an agent, all or part of which is already be installed at the smart sensor, is costly and inefficient. This disclosure describes techniques to map which smart sensors are associated with which agents, which applications are associated with which agents, and/or which agents are associated with which features, for ease and efficiency of management.

In some cases, a computing device associated with the application management service may receive a request to associate one or more smart sensors with a particular application. The application management service may determine, via an application manifest, one or more agents that are associated with the application and may also determine, via a mapping storage (e.g., list of smart sensors and associated agents) which agents are already installed or licensed on the specified one or more smart sensors. The application management service may then determine at least one agent that is not currently installed or licensed on the one or more smart sensors and that is associated with the specified application. Once the agents that are not currently installed or licensed on the one or more smart sensors are determined, the application management service may send instructions to the one or more smarts sensors, or to another computing device (e.g., a utility supplier computing device) which causes the agents to be installed or licensed. By sending instructions to install or license only the agents that are not currently installed or licensed on the one or more smart sensors (as opposed to every agent that is associated with the application), the application management service enables a more efficient communication network be reducing unnecessary traffic and processor load.

In some examples, the application management service may be associated with a manufacturer, vendor, supplier, or other third-party that provides, services, or administers at least a portion of the distribution network and/or the communication network or that provides the application management service.

In some examples, the application management service may send the instruction to install or license the agent(s) to a computing device that may be associated with a utility supplier entity that provides a physical resource such as electricity, water, or gas to one more sites via a physical distribution network (e.g., the wires and pipes through which the resource passes to reach the sites). Smart sensors may be disposed at the one or more sites to measure consumption of the resource at the sites. The utility supplier may be in communication with the smart sensors via one or more communication networks (e.g., wired and/or wireless networks arranged in mesh, star, or other topologies). Both the application management service and the utility supplier may have the ability to communicate with and configure aspects of some or all of the smart sensors via the communication network.

Example Utility System

FIG. 1 is a diagram illustrating an example networked environment or architecture 100 including a computing device 102 and a computing device 104. The computing device 102 may be utilized, via a computing device 106, to install and/or license agents by receiving requests to associate an application with one or more smart sensors 108 or other smart sensors 108(1), 108(2), 108(3), . . . 108(N) (collectively referred to as "smart sensors 108"), where N is any integer greater than or equal to 1. In some examples, the computing device 102 may be associated with a first entity operating an application management service, such as a manufacturer, vendor, supplier, or other third-party that provides, services, or administers at least a portion of the distribution network and/or the communication network or that provides the application management service. In some examples, the computing device 104 may be associated with a second entity, such as a utility supplier entity that provides a physical resource such as electricity, water, or gas to one more sites via a physical distribution network (e.g., the wires and pipes through which the resource passes to reach the sites). Both the computing device 102 and the computing device 104 may have the ability to communicate with and configure aspects of some or all of the smart sensors 108 via a wired or wireless network 110.

The term "smart sensor" means a measuring and/or sensing equipment which measures or senses physical characteristics (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device. The smart sensors 108 may be in communication by wireless (e.g., radio frequency) and/or wired (e.g., power line communication, Ethernet, serial, etc.) connections and may be configured to collect information (e.g., resource consumption information, network traffic information, weather information, etc.) and to report the collected information to the computing device 102 or the computing device 104 via the wired or wireless network 110, such as the Internet, a cellular network, or the like. The network 110 may itself be made up of one or more other wired and/or wireless networks.

The computing device 102 may include a mapping storage 114, an application manifest 116, and an agent manifest 118. The mapping storage 114 may include a list which maps each smart sensor 108 with the agents that are installed or licensed on the individual smart sensors 108. The smart sensors 108 may have installed or licensed any number of agents. In some cases, the smart sensors 108 may have an agent installed, but not active because the agent is not yet licensed to be operational. In some cases, the smart sensors 108 may have no agents installed and may require an agent to be installed in order for the agent to be operational on the smart sensors 108. The application manifest 116 may include a list of applications available to be associated with the smart sensors 108 and the associated agents for each application. For example, each application may have a different combination of agents that are required to operate the application. The agents may be stored on the one or more smart sensors 108 and may report data to the application, which may be running on one or more remote computing devices (e.g., utility company computing devices, cloud computing resources, or the like). Although the combination of agents may be different for each application, some applications may share at least one agent in common that are required to run the application. In some examples, the applications may be associated with theft detection, utility testing, demand response, etc. The agent manifest 118 may include a list of agents and the features associated with each individual agent. For example, each agent may require a different combination of features that operate on the smart sensor 108 in order to collect the data and/or perform an operation that that is associated with the agent. Similar to the relationship between an application and an agent, although the combination of features may be different for each agent, some agents may share at least one feature in common that are required for the agent to function.

Referring back to FIG. 1, a user (e.g., an application management service employee, a utility supplier employee, consumer, or other user) may access a user interface 112 using the computing device 106. Using a web browser or an app store client program resident on computing device 106, the user may access a website or other interface to an application store service that may be operated by the computing device 102. For instance, the user interface 112 may present options to the user for selecting applications, selecting particular smart sensors 108 for which the application is to be associated with, selecting geographical regions associated with the smart sensors 108, etc. The user interface 112 may request a credential, such as a username or a password, of the user when accessing the user interface 112 to determine an identity of the user or an association of the user with one or more entities. The user may select a particular application, or multiple applications, to be associated with one or more smart sensors 108. The computing device 102 may determine, via the application manifest 116 and the agent manifest 118, which agents and which features are associated with the selected application(s). The computing device 102 may also determine, based on the selection by the user, one or more smart sensors 108 that the application(s) is to be associated with. Once the one or more smart sensors 108 are identified, the computing device 102 may determine one or more agents and/or features that are already installed and/or licensed on the smart sensors 108 by accessing the mapping storage 114 stored at the computing device 102. The one or more agents and/or features that are already installed and/or licensed on the smart sensors 108 may have been previously installed and/or licensed from a previous request to associate the smart sensors 108 with a previous application and may report data to said application. Once the agents and/or features that are associated with the application selected by the user are known, and the agents and/or features that are currently installed and/or licensed on the smart sensors 108 are known, the computing device 102 may determine which agents and/or features need to be installed and/or licensed on the smart sensors 108 in order for the selected application to function. In some cases, these agents and/or features may be referred to as the delta agents and/or features. Once the delta agents and/or features are known, the computing device 102 may transmit a signal to an agent repository 120 requesting agent identification information related to the delta agents and/or features. In some examples, the computing device 102 may store the agent identification information related to the delta agents and/or features and may not need to send a request for agent identification information to the agent repository 120. The agent identification information may include metadata usable to identify specific agents and/or features that are stored at the agent repository 120 or the computing device 102. In some cases, the agent identification information may include a uniform resource identifier (URI). Once the agent identification information is determined, the computing device 102 may transmit a signal to the computing device 104 which includes the agent identification information, identification information of at least one smart sensor 108, and an instruction to install and/or license the delta agent and/or feature on the at least one smart sensor 108. This transmission may cause the computing device 104 to request the delta agent and/or feature from the agent repository 120 (e.g., using the agent identification information), and, once the agent repository 120 transmits the delta agent and/or feature to the computing device 104, to install the delta agent and/or feature on to the specified one or more smart sensors 108.

In the example of FIG. 1, the user interface 112 includes multiple tabs, each representing a different category of management. In the illustrated example, four tabs are shown: settings, add/remove, create group, and other. In response to selection of each tab, the user interface 112 may display different options for managing one or more smart sensors 108 (e.g., associating an application with one or more smart sensors 108). However, the interface 112 may be configured in any other way suitable to present the management options that are available from the application store. For instance, instead of having multiple tabs for different categories of users on a single interface, the user interface 112 may display options using a tree-view. In some examples, the computing devices 102, 104, 106, and/or the agent repository 120 may communicate via one or more service busses or virtual private networks (VPNs).

Figure 2:
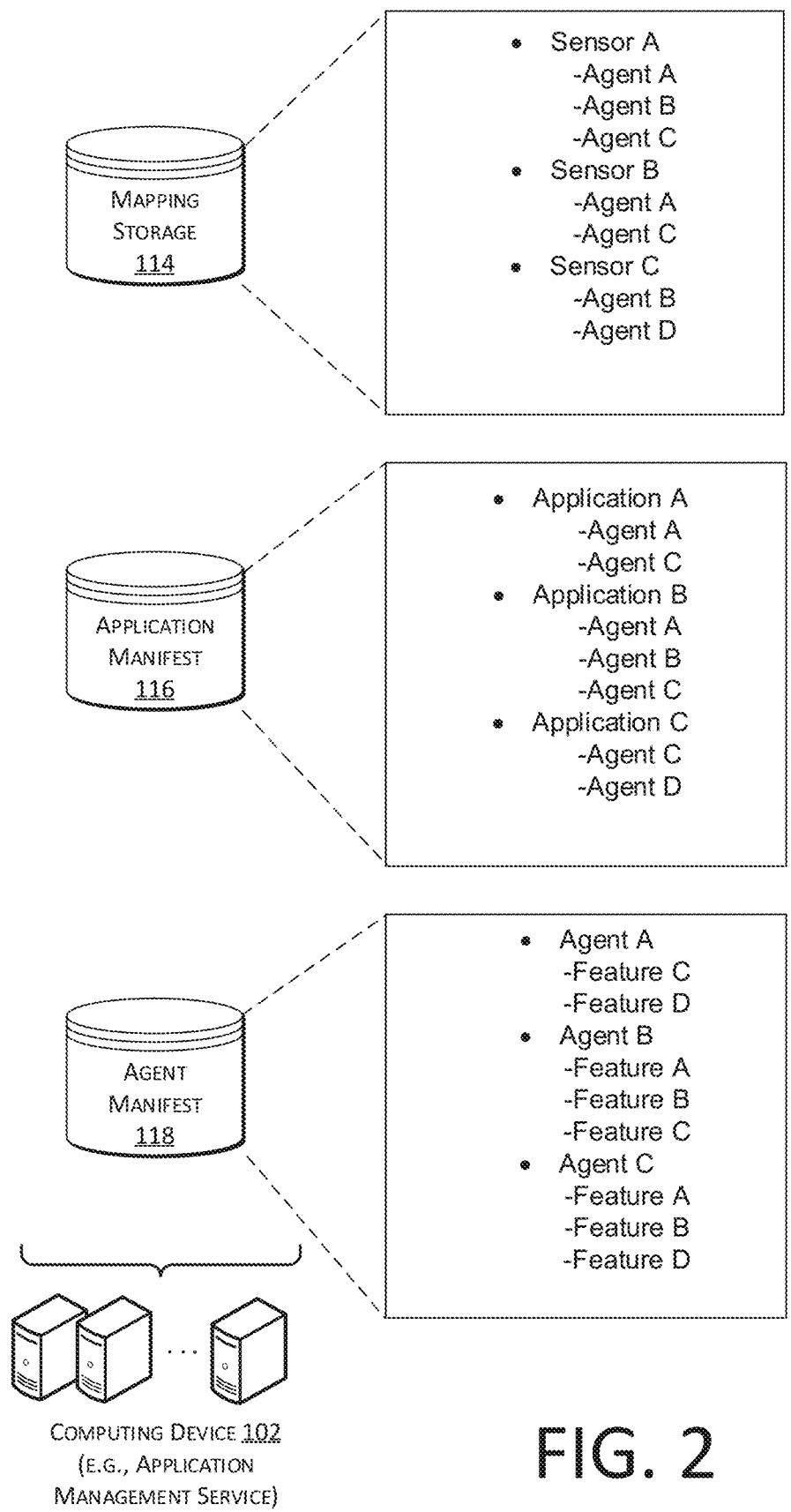
FIG. 2 is a schematic diagram of a computing device associated with an application management service.

FIG. 2 is a diagram illustrating the computing device 102, the mapping storage 114, the application manifest 116, and the agent manifest 118. As discussed above, when the computing device 102 receives a request from a user (e.g., an application management service employee, a utility supplier employee, consumer, or other user) to associate an application with one or more smart sensors 108, the computing device 102 may access the mapping storage 114, the application manifest 116, and the agent manifest 118 to determine a delta agent and/or feature that is not currently installed on the selected one or more smart sensors 108. In an example, a user may select "Application B" to be associated with "Sensor C." The computing device 102 may access the application manifest 116 and determine that "Application B" requires that "Agent A," "Agent B," and "Agent C" to be installed and/or licensed on to the "Sensor C" in order to function. The computing device 102 may also access the mapping storage 114 to determine that "Sensor C" already has "Agent B" and "Agent D" installed or licensed on the "Sensor C." In this case, the computing device 102 may determine that "Agent A" and "Agent C" are the delta agents that need to be installed or licensed on the "Sensor C" in order for the "Sensor C" to be fully associated with "Application B" and for the application to properly function because "Agent B" has been previously installed or licensed on the "Sensor C."

Although the mapping storage 114 illustrates only three smart sensors (i.e., "Sensor A, "Sensor B," and "Sensor C"), it is to be understood that any number of smart sensors 108 and their associated agents may be listed in the mapping storage 114. As discussed above, the smart sensors 108, which include "Sensor A, "Sensor B," and "Sensor C," may include a measuring and/or sensing equipment which measures or senses physical characteristics (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device.

Although the application manifest 116 illustrates only three applications ("Application A," "Application B," and "Application C"), it is to be understood that any number of applications and their associated agents may be listed in the application manifest 116.

Although the Agent manifest 116 illustrates only three agents ("Agent A," "Agent B," and "Agent C"), it is to be understood that any number of agents and their associated features may be listed in the agent manifest 116. In addition to the individual features of each agent being listed, the agent manifest 118 may also include identification information and version information related to each agent and feature. In some cases, the agent manifest 116 may store configuration parameter information related to each feature, such as a name of a parameter, a default parameter value, and/or a validation rule for a parameter. By way of example, features of an agent may include periodically communicating with an associated application, a location awareness feature (e.g., GPS, GNSS, etc.), metrology information, reporting schedules, impedance connection bypass information, detection of theft by meter bypass information, load disaggregation information, significant change detection information, service impedance information, command execution information, broken neutral information, and/or other information. In some cases, the computing device 102 may provide the configuration parameter information related to each feature to the computing device 104 such that each feature is properly configured on the specified smart sensor(s) 108 when installed or licensed.

Figure 3:
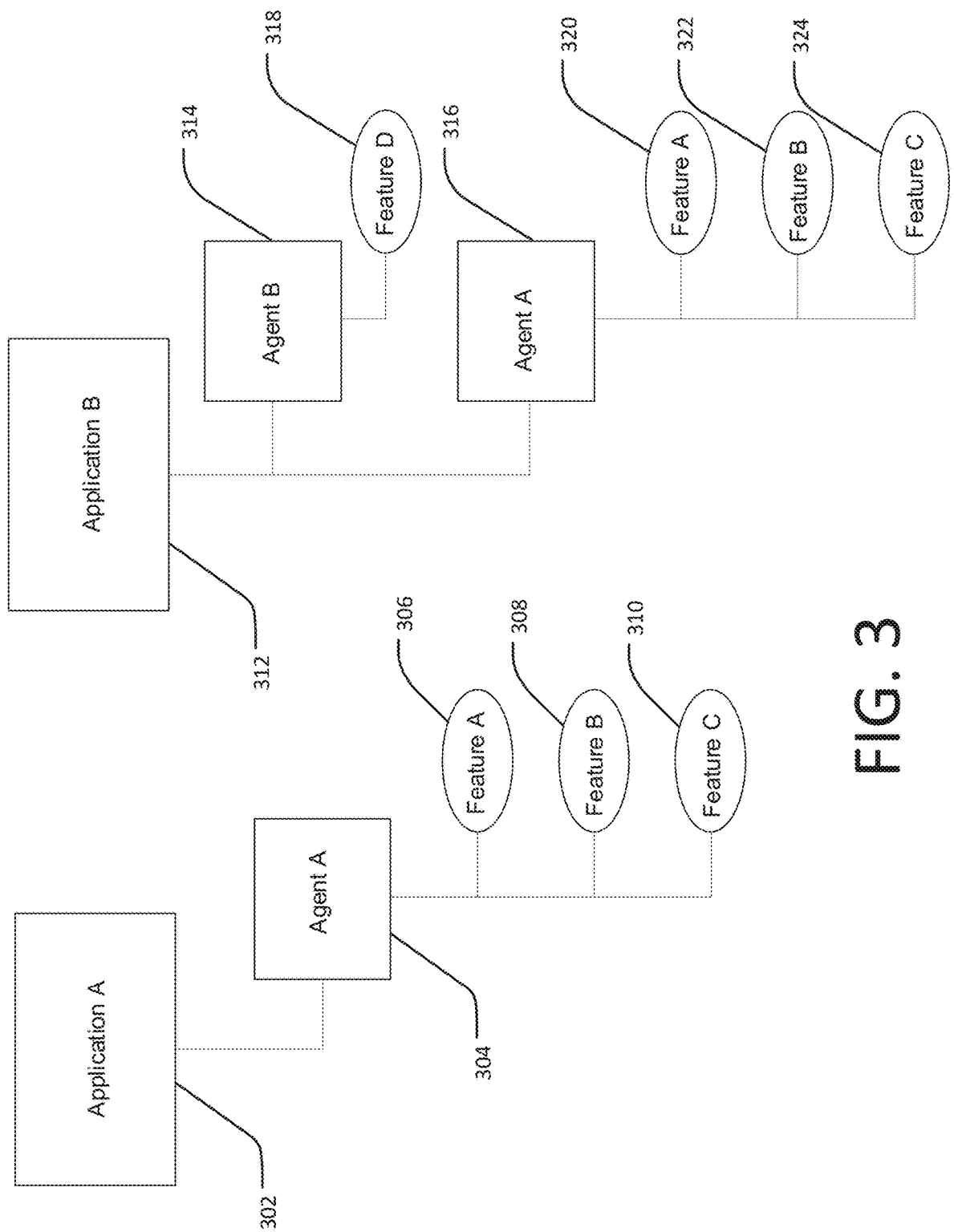
FIG. 3 is a schematic diagram illustrating an example hierarchal relationship between an applications, agents, and features.

FIG. 3 is a diagram illustrating an example hierarchal relationship between an applications, agents, and features. An application 302 may be associated with an agent 304, which may be associated with a feature 306, a feature 308, and a feature 310. Similarly, application 312 may be associated with an agent 314 and an agent 316. Agent 314 may be associated with a feature 318 and agent 316 may be associated with a feature 320, a feature 322, and a feature 324. The applications 302 and 312 may be stored and operated at a remote server and may be in communication with their respective agents (i.e., agent 304 of application 302 and agents 314 and 316 of application 312. Each of the applications 302 and 312 may be associated with one or more smart meters 108, which in turn store the agents 304, 314, and 316. When the agents 304, 314, and 316 are stored on the one or more smart sensors 108, the features 306, 308, 310, 318, 320, 322, and 324 collect data related to the smart sensor 108 or perform operations to the smart sensor 108. The agents 304, 314, and 316 may collect the data from the features 306, 308, 310, 318, 320, 322, and 324 and transmit the data to the associated applications 302 and 312. In some cases, an application may be associated with at least one agent that is in common with another, different application. For example, application 302 may be associated with agent 304 (labeled "Agent A") which includes features 306, 308, and 310 (labeled "Feature A," "Feature B," and Feature C," respectively). Application 312 may also be associated with "Agent A" (i.e., agent 316) as well as "Feature A," "Feature B," and Feature C" (i.e., features 320, 322, and 324). In cases where a user requests to associate a smart sensor 108 with the application 312, and the smart sensor 108 is already associated with the application 302, then the computing device 102 may determine that only the agent 314 needs to be installed and/or licensed on the smart sensor 108 because the agent 316 is already installed and/or licensed on the smart sensor 108 due to its association with application 302. By limiting the number of transmissions used for installing and/or licensing agents and/or features, the computing device 102 reduces the amount of traffic on a communication network thereby improving the efficiency of all computing devices participating in the communication network.

Example Computing Device

Figure 4:
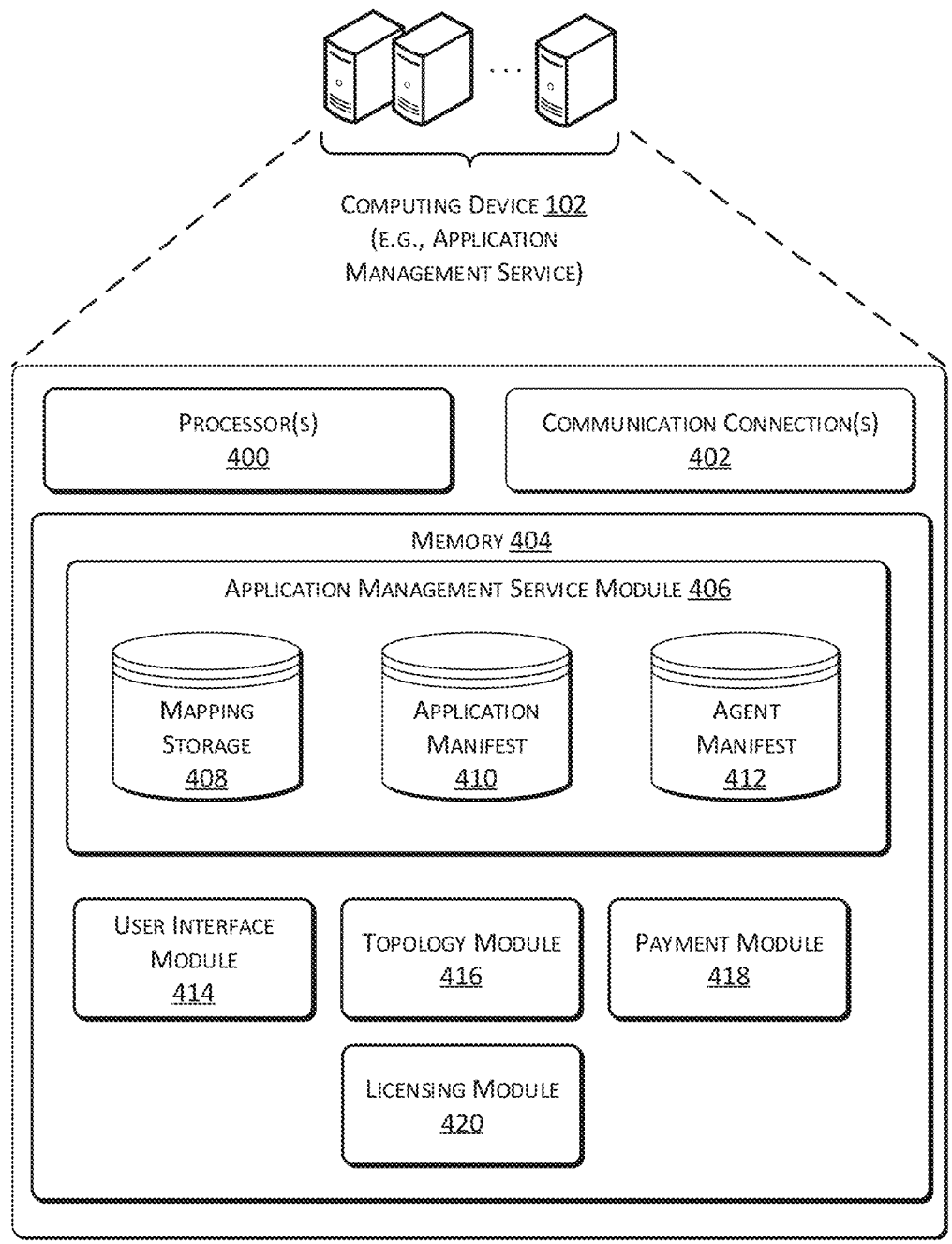
FIG. 4 is a block diagram illustrating details of an example of a first computing device, the first computing device being an example of one of the computing devices shown in FIG. 1.

FIG. 4 illustrates an example computing device, such as computing device 102 of FIG. 1, in more detail. The computing device 102 may be configured as or disposed at a server, a cluster of servers, a server farm, a data center, a cloud computing resource, or any other computing resource capable of storing and/or providing access to an application management service. In some examples, the computing device 102 may be associated with a first entity which may comprise a manufacturer, vendor, supplier, or other third-party that provides, services, or administers at least a portion of the distribution network and/or the communication network or that provides a group management service. The computing device 102 may include one or more processors 400, one or more communication connections 402, and memory 404. The memory 404 may include an application management service 406 with a plurality of modules to implement various functions of the computing device 102.

A mapping storage 408 may include a list which maps each smart sensor 108 with the agents that are installed or licensed on the individual smart sensors 108. The smart sensors 108 may have installed or licensed any number of agents. In some cases, the smart sensors 108 may have no agents installed or licensed. In some examples, the computing device 102 may receive a request to associate at least one smart sensor 108 with at least one application and the computing device 102 may determine one or more agents and/or features that are already installed and/or licensed on the smart sensors 108 by accessing the mapping storage 408 stored at the computing device 102. The one or more agents and/or features that are already installed and/or licensed on the smart sensors 108 may have been previously installed and/or licensed from a previous request to associate the smart sensors 108 with a previous application and may report data to said application. The mapping storage 408 may be generated based on information stored in an application manifest 410 and/or an agent manifest 412. In some cases, the mapping storage 408 may be stored on a remote server and the computing device 102 may send a request to the mapping storage 408 for information regarding the smart sensors 108, such as which agents are installed on the smart sensors 108.

The application manifest 410 may include a list of applications available to be associated with the smart sensors 108 and the associated agents for each application (sometimes referred to as agent data). For example, each application may have a different combination of agents that are required to operate the application. The agents may be stored on the one or more smart sensors 108 and may report data to the application, which may be stored on a remote server. Although the combination of agents may be different for each application, some applications may share at least one agent in common that are required to run the application. The application manifest 410 may include an index having a listing of the applications by topic, category, feature, product, or the like. The application manifest 410 may also include metadata associated with the applications. By way of example and not limitation, the metadata may include, for each application, a category of the application, a version of the application, compatibility of the application with specific software and/or hardware, keywords associated with the applications, brief descriptions of the application, feature specifications of the application, or the like. The applications may be associated with theft detection, utility testing, demand response, etc. In some examples, the computing device 102 may receive a request to associate at least one smart sensor 108 with at least one application and the computing device 102 may determine, via the application manifest 410, which agents are associated with the selected application(s). The information in the application manifest 410 may be provided by an entity associated with an application management service that may be associated with a manufacturer, vendor, supplier, or other third-party that provides, services, or administers at least a portion of the distribution network and/or the communication network or that provides the application management service.

The agent manifest 412 may include a list of agents and the features associated with each individual agent. For example, each agent may require a different combination of features that operate on the smart sensor 108 in order to collect the data and/or perform an operation that that is associated with the agent. The agent manifest 412 may also include identification information and version information related to each agent and feature. In some cases, the agent manifest 116 may store configuration parameter information related to each feature, such as a name of a parameter, a default parameter value, and/or a validation rule for a parameter. The features associated with the agents may perform operations in the "background" of the smart sensors 108 and provide data related to the smart sensors 108 or the environment in which the smart sensors 108 are located. By way of example, features of an agent may include periodically communicating with an associated application, a location awareness feature (e.g., GPS, GNSS, etc.), metrology information, reporting schedules, impedance connection bypass information, detection of theft by meter bypass information, load disaggregation information, significant change detection information, service impedance information, command execution information, broken neutral information, and/or other information. The information in the agent manifest 412 may be provided by an entity associated with an application management service that may be associated with a manufacturer, vendor, supplier, or other third-party that provides, services, or administers at least a portion of the distribution network and/or the communication network or that provides the application management service.

Once the agents and/or features that are associated with the application selected by the user are known, and the agents and/or features that are currently installed and/or licensed on the smart sensors 108 are known, the application management service module 406 may determine which agents and/or features need to be installed and/or licensed on the smart sensors 108 in order for the selected application to function (i.e., delta agents and/or features). Once the delta agents and/or features are known, the application management service module 406 may transmit a signal to the agent repository 120 requesting agent identification information related to the delta agents and/or features. In some examples, the computing device 102 may store the agent identification information related to the delta agents and/or features and may not need to send a request for identification information to the agent repository 120. The agent identification information may include metadata usable to identify specific agents and/or features that are stored at the agent repository 120. Once the agent identification information is determined, the application management service module 406 may transmit a signal to the computing device 104 which includes the agent identification information, identification information of at least one smart sensor 108, and an instruction to install and/or license the delta agent and/or feature on the at least one smart sensor 108.

A user interface module 414 may be configured to generate a graphical user interface (e.g., interface 112) presenting application store options that are available. The user interface module 414 may make the interface available to one or more users by, for example, publishing the interface to a website accessible by a browser of a client computing device. When accessed by the computing device, the user interface module 414 may serve the interface to the computing device displaying the application store options that are available along with controls usable to select the options.

Additionally or alternatively, if the computing device 102 has access to information about the devices in the utility communication network, it may verify compatibility prior to presenting the available applications to the user. For instance, the memory 404 may store a topology module 416 that is in communication with the computing device 104. In cases where the computing device 104 may be a utility supplier, the topology module 416 may maintain information about the device types, current software versions, and/or locations of devices in the utility supplier's communication network. Alternatively, the memory 404 may maintain a record of all device types for which the user has previously purchased applications, and the versions of applications purchased. In either case, the user may be presented only with applications that are compatible with devices in the utility's own communication network.

A payment module 418 may be configured to provide a payment interface usable to allow a user to purchase an application. The payment module 418 may also be configured to receive and process payment information, generate appropriate billing information, and/or update user account information based on the received payments.

A licensing module 420 may be configured to store and manage license agreements that are associated with the various agents. For example, the computing device 102 may be associated with an entity that creates agents as well as licenses agents to and from other entities that also create and/or use agents. The licensing module 420 may store a record of each agent and the licensing details of the agent, such as, but not limited to, the length of time the agent is to be licensed, the price for which the agent is being licensed, an identifier of a computing device (e.g., smart utility sensor and/or smart utility meter) on which the agent is to be licensed, and the like.

The computing device 102 may also include one or more communication connections 402 to enable the computing device 102 to communicate with other computing devices locally or over the network 110. Examples of communication connections include, without limitation, power line communication (PLC) connections, Ethernet or other wired network connections, cellular communication connections, RF communication connections, or the like. As such, the computing device 102 also includes any ancillary hardware, modules, and/or interfaces associated with or needed for the operation of the particular communication connections.

Example Computing Device 104

Figure 5:
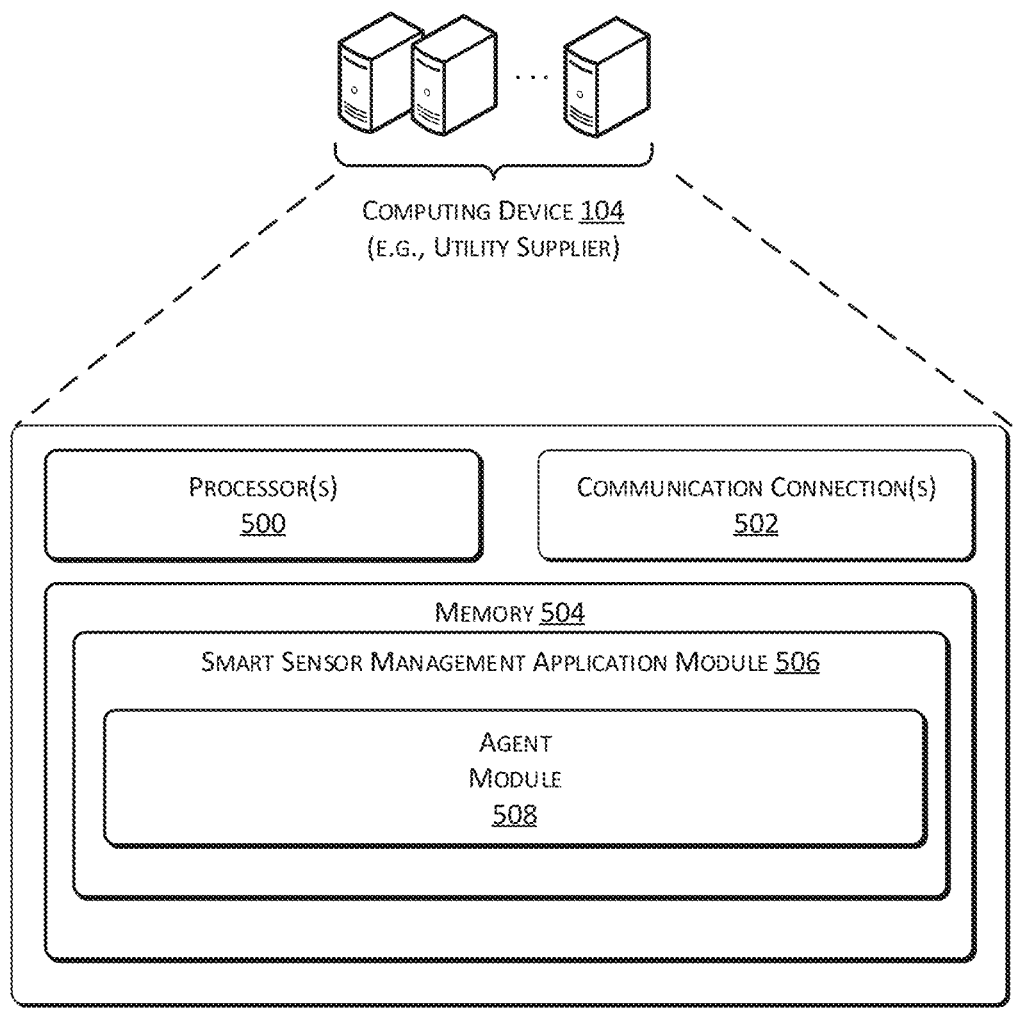
FIG. 5 is a block diagram illustrating details of an example second computing device, the second computing device being an example of one of the computing devices shown in FIG. 1.

FIG. 5 illustrates an example computing device 104 of FIG. 1 in more detail. The computing device 104 may be configured as or disposed at a server, a cluster of servers, a server farm, a data center, a cloud computing resource, or any other computing resource capable of storing and/or providing access to a smart sensor management application. In some examples, the computing device 104 may be associated with a utility supplier entity that provides a physical resource such as electricity, water, or gas to one or more sites via a physical distribution network (e.g., the wires and pipes through which the resource passes to reach the sites). The computing device 104 may include one or more processors 500, one or more communication connections 502, and memory 504. The memory 504 may include a plurality of modules to implement various functions of the computing device 104. A smart sensor management application module 506 may be configured to communicate with the application management service module 406 of the computing device 102 and to communicate with the smart sensor(s) 108. In some examples, the smart sensor management application module 506 may receive a signal from the application management service module 406 which includes agent identification information, identification information of at least one smart sensor 108, and an instruction to install and/or license the delta agent and/or feature on the at least one smart sensor 108. This transmission may cause the smart sensor management application module 506 to request the delta agent and/or feature from the agent repository 120 (e.g., using the agent identification information), and to install the delta agent and/or feature on to the specified one or more smart sensors 108.

An agent module 508 may be configured to store agents and agent related information that may be received from the computing device 102 and/or the agent repository 120 and that can be transmitted to the smart sensor(s) 108, as discussed above regarding providing delta agents and/or features on to the specified one or more smart sensors 108.

Example Smart Sensor

Figure 6:
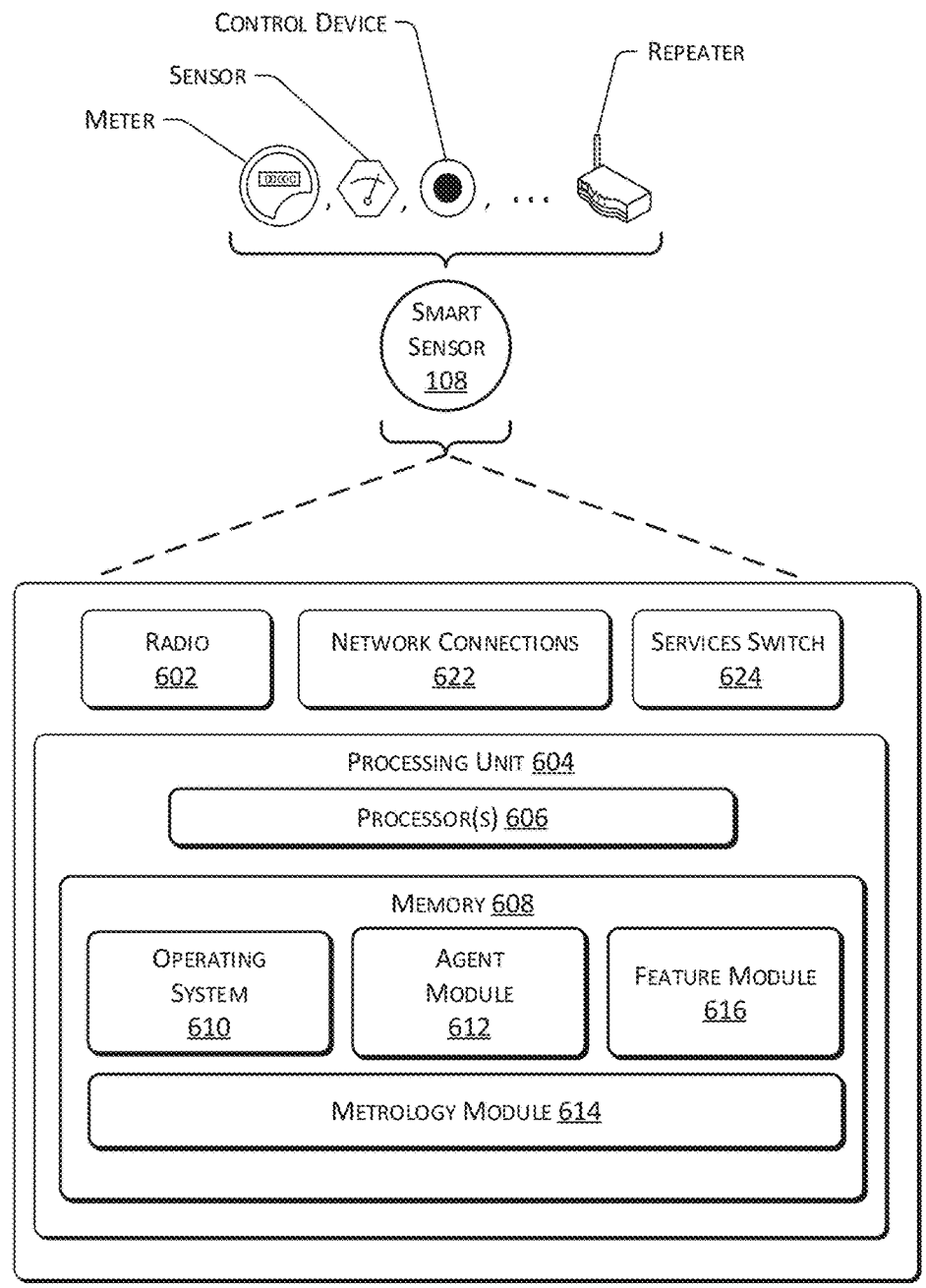
FIG. 6 is a block diagram illustrating details of an example smart sensor, the smart sensor being an example of one of the multiple smart sensors shown in FIG. 1.

FIG. 6 is a diagram showing example details of an individual smart sensor 108. As discussed above, the smart sensor may comprise a smart utility meter (e.g., electricity meter, water meter, or gas meter), a relay, a repeater, a smart grid router, a transformer, or any other utility network computing device. The smart sensor 108 may be configured for interaction with other smart sensor(s) 108, the computing device 102, the computing device 104, the computing device 106, as well as potentially other computing devices (e.g., consumer computing devices, utility network computing devices, web services, and the like). As noted above, in some examples, the smart sensor 108 may comprise a smart utility meter.

As shown in the example of FIG. 6, the smart sensor 108 may include a radio 602, a processing unit 604, and a services switch 624. The radio 602 may provide two-way RF communication with other smart sensors 108 and/or other computing devices via the network 110. The processing unit 604 may include one or more processors 606 and memory 608 and/or other hardware device(s), such as an application specific integrated circuit (ASIC), a gate array or other hardware-based logic device. The memory 608 may include an operating system (OS) 610 and agent information stored in an agent module 612.

In embodiments in which the smart sensor 108 comprises a utility meter, the smart sensor 108 may include a metrology module 614 configured to receive consumption data of a resource (e.g., electricity, water, or gas) at a site of the meter. The metrology module 614 may report the consumption data to the computing device 102, the computing device 104, and/or the computing device 106 by RF transmission via the radio 602. The consumption data may be formatted and/or packetized in a manner or protocol for transmission over the utility communication network.

In addition to the radio 602, the smart sensor 108 may include one or more other network connections 622, such as power line communications (PLC) connections, Ethernet or other wired network connections, RF connections, cellular communication connections, or the like. As such, the smart sensor 108 may also include any ancillary hardware, modules, and/or interfaces associated with or needed for the operation of the particular network connections.

A feature module 616 may be configured to store features and feature related information that are associated with applications and agents. For example, when the smart sensor 108 receives an instruction to install or license an agent, the feature module 616 may activate or deactivate certain features that may be stored on the smart sensor 108. These features may include reporting data to the computing device 102 or the computing device 104, determining a location of the smart sensor 108, measuring a consumption of a resource, etc.

Although the agent module 612 and the feature module 616 are illustrated as separate blocks in the memory 608, it is to be understood that the agent module 612 may represent one or more separate agents such as the agents shown in FIG. 3, that each agent may have one or more associated features, and that the associated features of each agent may be different or may be in common amongst multiple agents.

The OS 610, the agent module 612, the metrology 614, and the feature module 616, and even software aspects of the radio 602 are all examples of applications that may be executable by the smart sensor 108.

Memories 504 and 608 are shown to include software functionality configured as one or more "modules." However, the modules are intended to represent example divisions of the software for purposes of discussion and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

While detailed examples of certain computing devices (e.g., computing device 102, computing device 104, and smart sensors 108) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

The various memories described herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Signal Flow Diagram of Installing and/or Licensing an Agent

Figure 7:
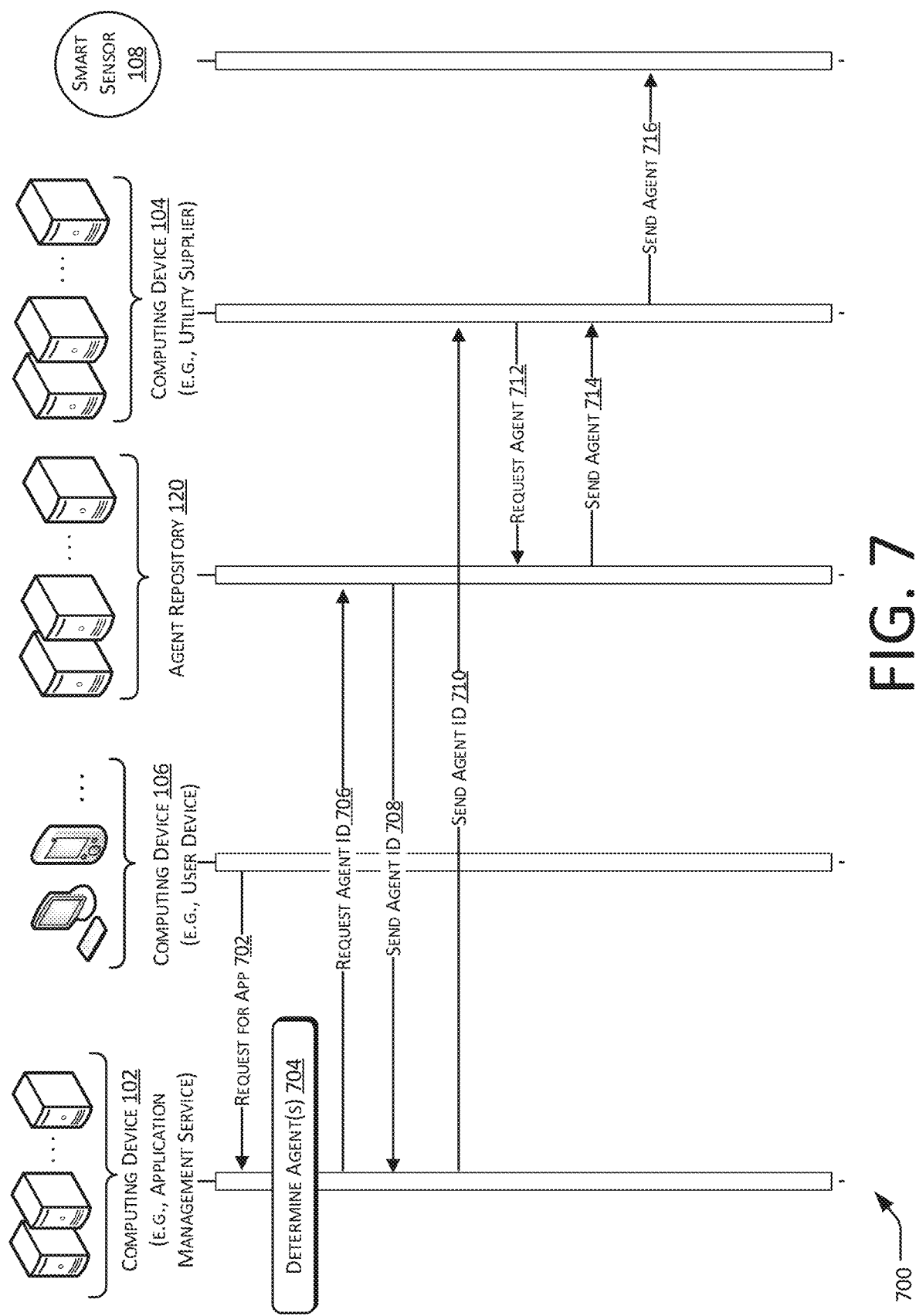
FIG. 7 is a signal flow diagram of an example method of management of applications for one or more smart utility meters or other smart sensors.

FIG. 7 is a signal flow diagram which illustrates an example flow of operations 700 that may be used to determine a delta agent and/or feature and to install and/or license the delta agent and/or feature onto a smart sensor 108. The example flow of operations 700 is described in the context of the example of architecture 100 and with reference to the devices illustrated in FIG. 1. However, the flow of operations 700 is not limited to use with the architecture 100 and devices of FIG. 1 and may be implemented using other architectures and devices.

The flow of operations 700 may begin, at block 702, when a first computing device (e.g., computing device 102) receives a request to associate an application with a smart sensor (e.g., smart sensor 108). For example, a user (e.g., an application management service employee, a utility supplier employee, consumer, or other user) may access the user interface 112 using the computing device 106. Using a web browser or an app store client program resident on computing device 106, the user may access a website or other interface to an application store service that may be operated by the computing device 102. For instance, the user interface 112 may present options to the user for selecting applications, selecting particular smart sensors 108 for which the application is to be associated with, selecting geographical regions associated with the smart sensors 108, etc. The user may select a particular application, or multiple applications, to be associated with one or more smart sensors 108.

At 704, the first computing device may determine which agents need to be installed and/or licensed in order for the application to function properly. The computing device 102 may determine, via the application manifest 116 and the agent manifest 118, which agents and which features are associated with the selected application(s). The computing device 102 may also determine, based on the selection by the user, one or more smart sensors 108 that the application(s) is to be associated with. Once the one or more smart sensors 108 are identified, the computing device 102 may determine one or more agents and/or features that are already installed and/or licensed on the smart sensors 108 by accessing the mapping storage 114 stored at the computing device 102. The one or more agents and/or features that are already installed and/or licensed on the smart sensors 108 may have been previously installed and/or licensed from a previous request to associate the smart sensors 108 with a previous application and may report data to said application. Once the agents and/or features that are associated with the application selected by the user are known, and the agents and/or features that are currently installed and/or licensed on the smart sensors 108 are known, the computing device 102 may determine which agents and/or features need to be installed and/or licensed on the smart sensors 108 in order for the selected application to function (also referred to as delta agents and/or features).

At 706, the first computing device may request agent identification information from an agent repository. For example, once the delta agents and/or features are known, the computing device 102 may transmit a signal to an agent repository 120 requesting agent identification information related to the delta agents and/or features. The agent identification information may include metadata usable to identify specific agents and/or features that are stored at the agent repository 120.

At 708, the first computing device may receive the agent identification information. In some cases, the flow of operations 700 may continue from step 704 directly to step 710 because the computing device 102 may store the agent identification information in the memory 404 of the computing device 102. In this case, the computing device 102 would not need to request the agent identification information from the agent repository, but, would rather, continue directly to step 710 after determining which agents need to be installed and/or licensed in order for the application to function properly.

At 710, the first computing device may send the agent identification information to a second computing device (e.g., the computing device 104). For example, once the agent identification information is received and/or determined, the computing device 102 may transmit a signal to the computing device 104 which includes the agent identification information, identification information of at least one smart sensor 108, and an instruction to install and/or license the delta agent and/or feature on the at least one smart sensor 108. The identification information may include a uniform resource identifier (URI).

At 712, the second computing device may request an agent from the agent repository and at 714 the second computing device may receive the requested agent. For example, the computing device 104 may request the delta agent and/or feature from the agent repository 120 (e.g., using the agent identification information).

At 714, the second computing device may send the agent to the smart sensor causing the agent and the associated features to be installed on the smart sensor. For example, once the computing device 104 requests the delta agent and/or feature from the agent repository 120 (e.g., using the agent identification information) and receives the delta agent and/or feature, the computing device 104 may send the delta agent and/or feature to the smart sensor 108 to be installed.

Example Method of Determining an Agent for Installation

Figure 8:
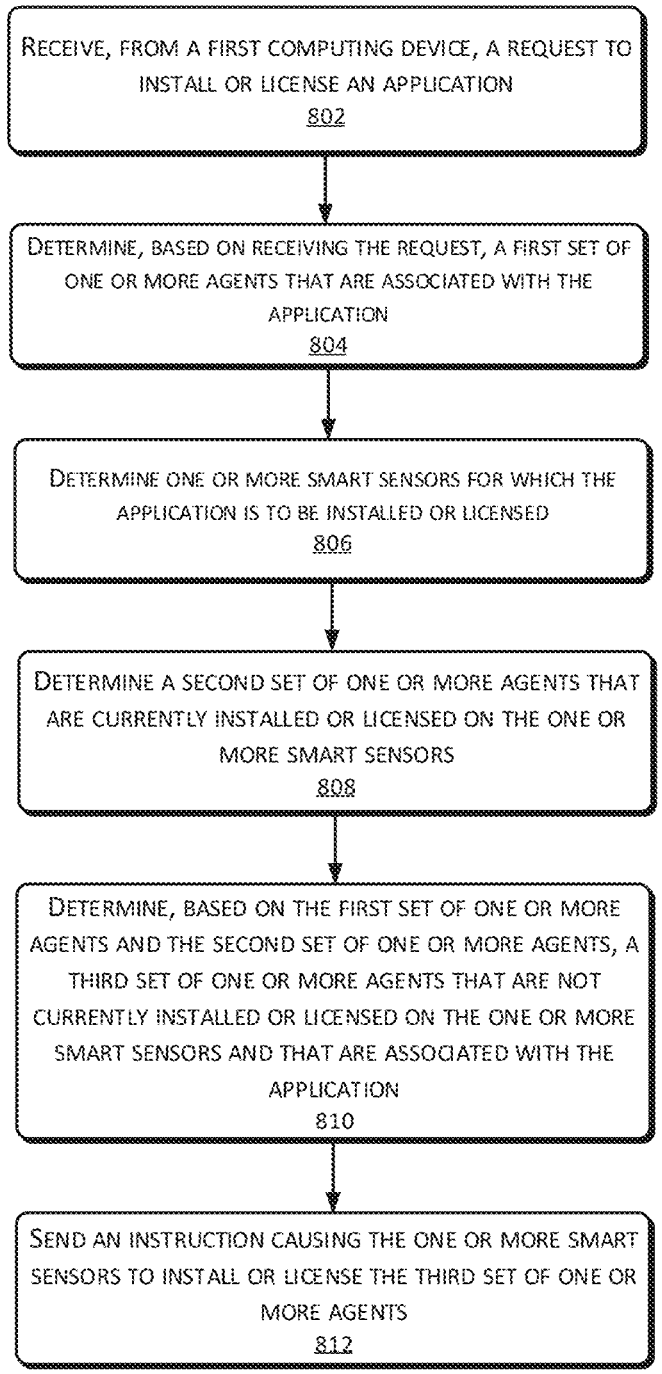
FIG. 8 is a flowchart of an example method that may be implemented by a computing device to facilitate management of applications for one or more smart utility meters or other smart sensors.

FIG. 8 is a flowchart which illustrates an example flow of operations 800 that may be performed by a first computing device, such as the computing device 102, to determine one or more agents that are needed to be installed on a smart sensor in order for the smart sensor to be associated with an application, within the context of the example of architecture 100 and with reference to the devices illustrated in FIG. 1. However, the flow of operations 800 is not limited to use with the architecture 100 and devices of FIG. 1 and may be implemented using other architectures and devices.

The flow of operations 800 may begin, at block 802, with a first computing device receiving, from a first computing device, a request to install or license an application. In one example, a user (e.g., an application management service employee, a utility supplier employee, consumer, or other user) may access the user interface 112 using the computing device 106. Using a web browser or an app store client program resident on computing device 106, the user may access a website or other interface to an application store service that may be operated by the computing device 102. For instance, the user interface 112 may present options to the user for selecting applications, selecting particular smart sensors 108 for which the application is to be associated with, selecting geographical regions associated with the smart sensors 108, etc. The user may select a particular application, or multiple applications, to be associated with one or more smart sensors 108.

At 804, the first computing device may determine a first set of one or more agents that are associated with the application. For instance, the computing device 102 may include a mapping storage 114, an application manifest 116, and an agent manifest 118. The application manifest 116 may include a list of applications available to be associated with the smart sensors 108 and the associated agents for each application. The computing device 102 may determine, via the application manifest 116 and the agent manifest 118, which agents and which features are associated with the selected application(s).

At 806, the first computing device may determine, based at least in on part on receiving the request, one or more smart sensors for which the application is to be installed or licensed and at 808, the first computing device may determine a second set of one or more agents that are currently installed or licensed on the one or more smart sensors. In one example, the mapping storage 114 may include a list which maps each smart sensor 108 with the agents that are installed or licensed on the individual smart sensors 108. The smart sensors 108 may have installed or licensed any number of agents. In some cases, the smart sensors 108 may have an agent installed, but not active because the agent is not yet licensed to be operational. In some cases, the smart sensors 108 may have no agents installed and may require an agent to be installed in order for the agent to be operational on the smart sensors 108. Once the one or more smart sensors 108 are identified, the computing device 102 may determine one or more agents and/or features that are already installed and/or licensed on the smart sensors 108 by accessing the mapping storage 114 stored at the computing device 102.

At 810, the first computing device may determine, based at least in part on the first set of one or more agents and the second set of one or more agents, a third set of one or more agents that are not currently installed or licensed on the one or more smart sensors and that are associated with the application. In one example, once the agents and/or features that are associated with the application selected by the user are known, and the agents and/or features that are currently installed and/or licensed on the smart sensors 108 are known, the computing device 102 may determine which agents and/or features need to be installed and/or licensed on the smart sensors 108 in order for the selected application to function. In some cases, these agents and/or features may be referred to as the delta agents and/or features.

At 812, the first computing device may send an instruction to cause the third set of one or more agents to be installed or licensed on the one or more smart sensors. In one example, once the delta agents and/or features are known, the computing device 102 may transmit a signal to an agent repository 120 requesting agent identification information related to the delta agents and/or features. The agent identification information may include metadata usable to identify specific agents and/or features that are stored at the agent repository 120. Once the agent identification information is received, the computing device 102 may transmit a signal to the computing device 104 which includes the agent identification information, identification information of at least one smart sensor 108, and an instruction to install and/or license the delta agent and/or feature on the at least one smart sensor 108. This transmission may cause the computing device 104 to request the delta agent and/or feature from the agent repository 120 (e.g., using the agent identification information), and, once the agent repository 120 transmits the delta agent and/or feature to the computing device 104, to install the delta agent and/or feature on to the specified one or more smart sensors 108.

What is claimed is:

1. A method comprising:
    under control of an application management service computing device comprising one or more processors and memory storing executable instructions:
    receiving, from a first computing device, a request to install or license an application, the application comprising one or more agents configured to be stored on one or more smart sensors and to report data associated with the one or more smart sensors;
    determining a first set of one or more agents that are associated with the application;
    determining, based at least in part on receiving the request, the one or more smart sensors for which the application is to be installed or licensed;
    determining a second set of one or more agents that are currently installed or licensed on the one or more smart sensors;
    determining, based at least in part on the first set of one or more agents and the second set of one or more agents, a third set of one or more agents that are not currently installed or licensed on the one or more smart sensors and that are associated with the application; and
    sending an instruction to cause the third set of one or more agents to be installed or licensed on the one or more smart sensors.

2. The method of claim 1, wherein determining the first set of one or more agents comprises referencing an application manifest that stores information indicating at least one of an identification of the application, an identification of at least one agent that is associated with the application, or an identification of at least one feature that is associated with the at least one agent.

3. The method of claim 1, wherein determining the second set of one or more agents comprises referencing a list of the one or more smart sensors and the one or more agents that are currently installed or licensed on the one or more smart sensors.

4. The method of claim 1, wherein at least one agent of the third set of one or more agents is associated with at least one feature configured to collect data related to the one or more smart sensors.

5. The method of claim 1, further comprising determining one or more features that are not present in the second set of one or more agents that are currently installed or licensed on the one or more smart sensors and that are associated with the application by referencing an agent manifest that stores information indicating at least one of an identification of at least one agent, an identification of at least one feature that is associated with the at least one agent, or identification of at least one configuration parameter that is associated with the at least one feature.

6. The method of claim 5, wherein the at least one feature configuration parameter comprises at least one of:
    a name of the at least one configuration parameter;
    a default value of the at least one configuration parameter; or
    a validation rule for the at least one configuration parameter.

7. The method of claim 1, further comprising sending a request to a second computing device for identification information of the third set of one or more agents, wherein the second computing device stores a list of agents and associated identification information for individual agents in the list of agents.

8. The method of claim 7, further comprising sending the identification information of the third set of one or more agents to a third computing device that is associated with a utility supplier.

9. The method of claim 8, further comprising sending, to the third computing device, a request to cause the third computing device to obtain the third set of one or more agents from the second computing device.

10. A system comprising:
    one or more processors;
    memory communicatively coupled to the one or more processors, the memory storing instructions that, when executed by the one or more processors, cause the system to perform operations comprising:
    receiving, from a first computing device, a request to install or license an application, the application comprising one or more agents configured to be stored on one or more smart sensors and to report data associated with the one or more smart sensors;
    determining a first set of one or more agents that are associated with the application;
    determining, based at least in part on receiving the request, the one or more smart sensors for which the application is to be installed or licensed;
    determining a second set of one or more agents currently installed or licensed on the one or more smart sensors;
    determining, based at least in part on the first set of one or more agents and the second set of one or more agents, a third set of one or more agents that are not currently installed or licensed on the one or more smart sensors and that are associated with the application; and
    sending identification information of the third set of one or more agents to a second computing device.

11. The system of claim 10, wherein the identification information comprises metadata identifying at least one agent of the third set of one or more agents.

12. The system of claim 11, wherein the metadata comprises at least one uniform resource identifier (URI) associated with the at least one agent of the third set of one or more agents.

13. The system of claim 10, wherein each agent of the third set of one or more agents is associated with at least one feature, which is configured to operate on the one or more smart sensors to collect data related to the one or more smart sensors.

14. The system of claim 13, wherein the at least one feature includes at least one configuration parameter that operates at a default setting.

15. The system of claim 10, wherein determining the first set of one or more agents comprises referencing an application manifest that stores information indicating at least one of an identification of the application, an identification of at least one agent that is associated with the application, or an identification of at least one feature that is associated with the at least one agent.

16. A method comprising:
under control of an application management service computing device comprising one or more processors and memory storing executable instructions:
receiving an application manifest;
receiving, from a first computing device, a request to install or license an application, the application comprising one or more agents configured to be stored on one or more smart sensors and to report data associated with the one or more smart sensors;
determining a first set of one or more agents that are associated with the application based on the application manifest;
determining, based at least in part on receiving the request, the one or more smart sensors for which the application is to be installed or licensed;
determining a second set of one or more agents that are currently installed or licensed on the one or more smart sensors; and
determining, based at least in part on the first set of one or more agents and the second set of one or more agents, a third set of one or more agents that are not currently installed or licensed on the one or more smart sensors and that are associated with the application.

17. The method of claim 16, further comprising sending identification information of the third set of one or more agents to a second computing device that is associated with a utility supplier.

18. The method of claim 17, further comprising sending, to the second computing device a request to cause the second computing device to obtain the third set of one or more agents from a third computing device.

19. The method of claim 17, wherein sending the identification information of the third set of one or more agents to the second computing device comprises accessing a service bus accessible by the computing second device.

20. The method of claim 16, wherein the application comprises
a first application, and further comprising:
receiving a request to install or license a second application;
determining that at least one agent associated with the second application is already installed or licensed on the one or more smart sensors;
refraining from sending identification information of the at least one agent associated with the second application that is already installed or licensed on the one or more smart sensors.

* * * * *